United States Patent
Zuo et al.

(10) Patent No.: US 7,117,562 B2
(45) Date of Patent: Oct. 10, 2006

(54) AUTOMATIC OPENING AND CLOSING HINGE ASSEMBLY FOR PORTABLE ELECTRONIC DEVICES

(75) Inventors: Zhou-Quan Zuo, Shenzhen (CN); Chia-Hua Chen, Tu-cheng (TW)

(73) Assignees: Shenzhen FuTaiHong Precision Industrial Co., Ltd., Shenzhen (CN); Sutech Trading Limited, Tortola (VG)

( * ) Notice: Subject to any disclaimer, the term of this patent is extended or adjusted under 35 U.S.C. 154(b) by 0 days.

(21) Appl. No.: 11/094,376

(22) Filed: Mar. 30, 2005

(65) Prior Publication Data

US 2005/0225093 A1    Oct. 13, 2005

(30) Foreign Application Priority Data

Apr. 9, 2004    (TW)    ............................. 93205426 U

(51) Int. Cl.
    *E05F 1/08*    (2006.01)
(52) U.S. Cl. .................... 16/303; 16/330; 16/248
(58) Field of Classification Search ................ 16/303, 16/330, 284, 248; 455/575.1, 575.3; 379/433.13, 379/434; 361/686, 803
See application file for complete search history.

(56) References Cited

U.S. PATENT DOCUMENTS

| | | | | |
|---|---|---|---|---|
| 5,923,751 | A * | 7/1999 | Ohtsuka et al. | 379/433.13 |
| 6,065,187 | A * | 5/2000 | Mischenko | 16/341 |
| 6,085,387 | A | 7/2000 | Han | 16/330 |
| 6,766,180 | B1 * | 7/2004 | Doraiswamy et al. | 455/575.1 |
| 6,886,221 | B1 * | 5/2005 | Minami et al. | 16/324 |
| 6,917,824 | B1 * | 7/2005 | Kobayashi | 455/575.3 |
| 2004/0177477 | A1 * | 9/2004 | Hsieh | 16/303 |

* cited by examiner

*Primary Examiner*—Chuck Y. Mah
*Assistant Examiner*—Mark T. Vogelbacker
(74) *Attorney, Agent, or Firm*—Morris Manning & Martin LLP; Tim Tingkang Xia, Esq.

(57) ABSTRACT

A hinge assembly (10) for joining a cover section (012) to a body section (014) of a foldable electronic device (01) includes: a button (1); a locking element (2); a main shaft (4); a driving spring (3); a cam (5) including a latching cam surface (54) on one end thereof, and two reverse rotating grooves (56) on another end thereof; a barrel (6) including two latching posts (62) engaging in the grooves; an end shaft (8); and a torsion spring (7) including two end portions attached to the barrel and the end shaft. The button, the locking element and the driving spring are located around one end of the main shaft, and the cam and the barrel are located around another end of the main shaft. When the button is pushed, the hinge assembly fully opens the cover section from body section. This provides a user with convenient one-handed operation.

12 Claims, 8 Drawing Sheets

AUTOMATIC OPENING AND CLOSING HINGE ASSEMBLY FOR PORTABLE ELECTRONIC DEVICES

FIELD OF THE INVENTION

The present invention relates to hinge assemblies, and particularly to an automatic opening and closing hinge assembly for foldable electronic devices such as portable telephones, portable computers, and so on.

DESCRIPTION OF THE RELATED ART

At present, perhaps the most popular portable electronic device in the marketplace is the foldable cellular telephone, which generally includes a cover section and a body section. The cover section and the body section are rotatably interconnected through a hinge assembly, for switching the telephone between an in-use position and a closed position.

One kind of hinge assembly employs a torsion coil spring and a cam to make the cover section open up from the body section and be held in an opened position. An example of such kind of hinge assembly is disclosed in U.S. Pat. No. 6,085,387, and is represented in FIG. 8 herein. The hinge assembly includes a can 90, a follower 92, a cam 94, and a spring 96. A longitudinal centerline of the can 90 defines a rotating axis 990 of the hinge assembly.

The can 90 comprises two symmetrically opposite sidewalls 904 and two symmetrically opposite sidewalls 905, and has a first end 911 and an opposite second end 912. The first end 911 comprises a wall 901, which defines a hole 902 therein. The second end 912 is open. Each sidewall 905 defines a groove 906 extending axially from the second end 912. Each sidewall 904 has a retaining protrusion 903 extending axially from the second end 912. Each retaining protrusion 903 can be bent along a bending line 907, so as to at least partially cover the second end 912.

The follower 92 has a disk-shaped body 922, and a shaft 924 extending from one end surface of the body 922 along the axis 990. The shaft 924 has engaging surfaces 925, for latching with a cover section of a foldable cellular telephone. Two protrusions 926 extend from an opposite end surface of the body 922 along a direction parallel to the axis 990. The protrusions 926 are diametrically opposite each other across the rotating axis 990.

The cam 94 has a body 946 substantially in the shape of an octagonal plate corresponding to an inside of the can 90. A pair of tabs 948 are formed on two opposite sides of the body 946. A generally cylindrical cam portion 942 is formed on one end of the body 946. The cam portion 942 has two peaks and two valleys.

In assembly, the follower 92, the cam 94 and the spring 96 are disposed into the can 90 in turn. Then the retaining protrusions 903 of the can 90 are bent along the bending lines 907 in order to cover the second end 912 of the can 90. The shaft 924 of the follower 92 protrudes out from the hole 902 of the can 90, and can be engaged with the cover section of the telephone. The cam 94 slides along the grooves 906 of the can 90, and rotates together with the can 90 via the tabs 948. The can 90 is engaged with a body section of the telephone. The protrusions 926 of the follower 92 always contact the cam portion 942, due to the elastic force of the spring 96.

In the above-described hinge assembly, when the cover section is only required to be opened a small angle, the cover section automatically rotates to a predetermined position by means of the engaging relationship of the follower 92 and the cam 94. However, even though the movement track of the follower 92 and the cam 94 is the same when the mobile phone is opened or closed, the movement direction of the cam 94 is contrary to that of the follower 92 in both cases. This can result in excessive abrasion of elements of the hinge assembly, and thus reduce the effective working lifetime of the hinge assembly. In addition, the protrusions 926 of the follower 92 and the cam portions 942 of the cam 94 have symmetrically opposite configurations, so that the two steady positions of the cover section are 180 degrees apart from each other. However, many mobile phones need to be opened to other positions such as 150 or 160 degree positions. This means that the body section of the mobile phone itself needs to be specially designed in order to limit the maximum opening angle of the cover section. This takes up valuable "real estate" on the body section, and increases the complexity of manufacture of the body section. Furthermore, each time the cover section is opened, it impacts the body section. The body section is liable to become worn or damaged, thereby shortening the working lifetime of the mobile phone.

Therefore, there is a need for a new hinge assembly that overcomes the above-described problems.

SUMMARY

Accordingly, what is needed is an automatic opening and closing hinge assembly for devices such as mobile phones, in which the hinge assembly itself opens the device to a desired angle.

To achieve the above-mentioned object, an automatic opening and closing hinge assembly for joining a flip cover section to a body section of a foldable electronic device of the preferred embodiment includes: a button having an open end; a locking element comprising at least one latching block at an outer wall thereof, and defining at least one polygonal hole therein; a main shaft including a shaft portion and a cylinder portion, the shaft portion comprising at least one latching protrusion at an end thereof, the cylinder portion comprising a cam surface distal from the latching protrusion, the latching protrusion engaging in the polygon hole of the locking element; a driving spring around the main shaft, one end of the driving spring resisting the locking element, another end of the driving spring resisting the cylinder portion; a cam, one end of the cam comprising a latching cam surface, another end of the cam comprising at least one reverse rotating groove, the latching cam surface engaging with the cam surface of the cylinder portion; a barrel, one end of the barrel comprising at least one latching post engaging in the reverse rotating groove; an end shaft; and a torsion spring comprising two end portions attached to the barrel and the end shaft respectively. The button, the locking element and the driving spring are located around one end of the main shaft, and the cam and the barrel are located around another end of the main shaft. When the button is pushed, the hinge assembly fully opens the cover section from body section. This provides a user with convenient one-handed operation of the device.

Other objects, advantages and novel features of the invention will become more apparent from the following detailed description when taken in conjunction with the accompanying drawings, in which:

DETAILED DESCRIPTION OF THE INVENTION

Figure 1:
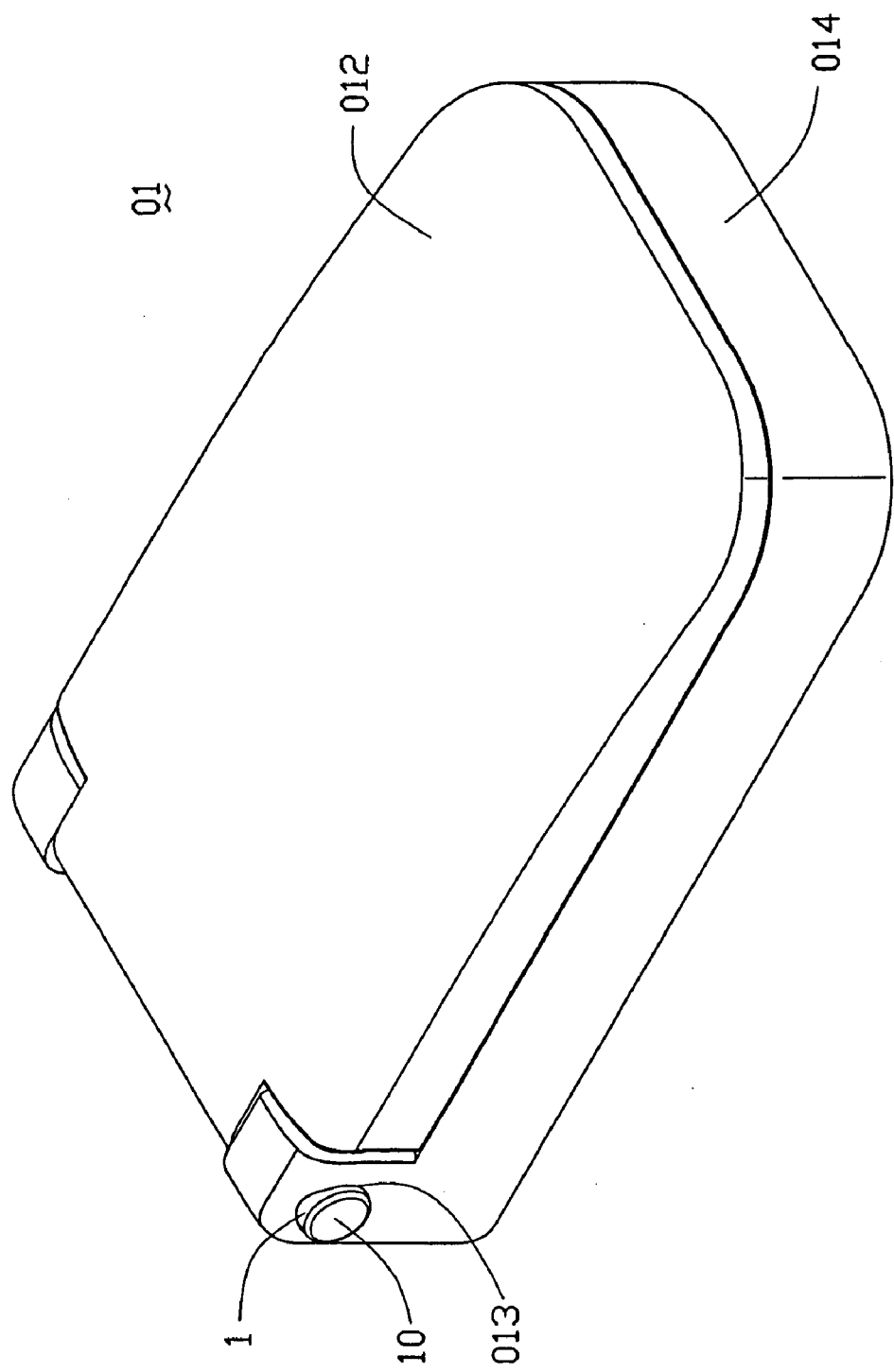
FIG. 1 is an isometric view of a mobile phone using a hinge assembly according to the present invention.
Figure 2:
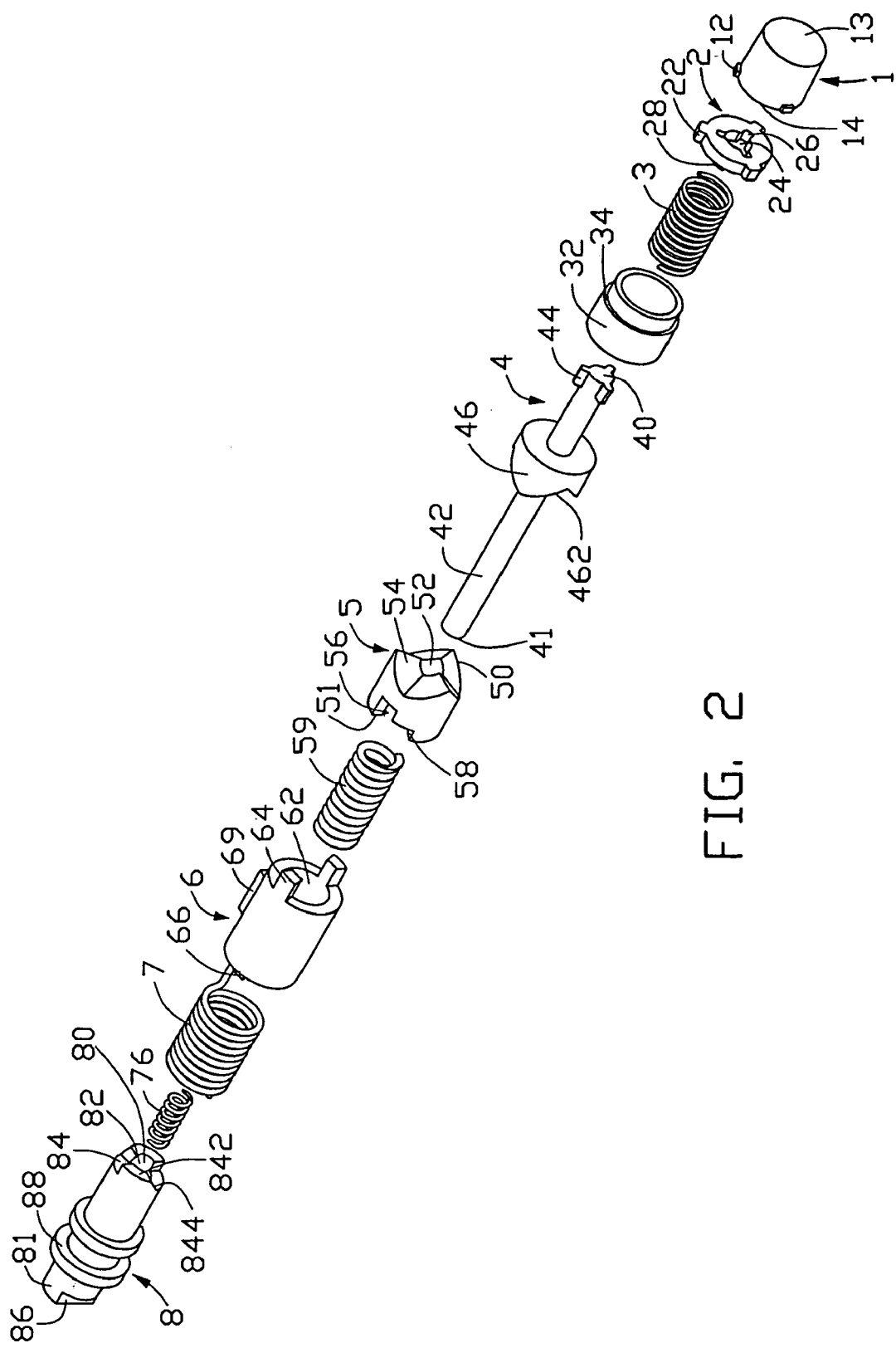
FIG. 2 is an exploded, isometric view of an embodiment of the hinge assembly of the present invention.

Referring now to the drawings in detail, FIG. 1 and FIG. 2 show that a hinge assembly 10 is applied to a flip type mobile phone 01, which has a cover section 012 and a body section 014 as two components thereof. A hollow connecting cylinder (not shown) is provided at one end of the cover section 012. A cavity 013 and a latching cavity (not shown) are defined in opposite sides of a same end of the body section 014. The hinge assembly 10 is connected in the cavity 013 of the body section 014, the connecting cylinder of the cover section 012, and the latching cavity of the body section 014, for pivotably coupling the body section 014 and the cover section 012 together.

The hinge assembly 10 includes a button 1, a locking element 2, a driving spring 3, a sleeve 32, a main shaft 4, a cam 5, a compression spring 59, a barrel 6, a torsion spring 7, a central spring 76, and an end shaft 8. The button 1, the locking element 2, the driving spring 3 and the sleeve 32 are placed to surround one end of the main shaft 4. The cam 5, the compression spring 59 and the barrel 6 are placed to surround an opposite end of the main shaft 4. Accordingly, the torsion spring 7, the central spring 76 and the end shaft 8 are connected to the barrel 6 in that order.

The button 1 is substantially a hollow cylinder with a closed end 13 and an open end 14. Three symmetrically spaced locating blocks 12 radially extend from an outside circumferential wall of the button 1 at the open end 14. The locating blocks 12 are spaced 120 degrees away from each other.

The locking element 2 is substantially a polygonal cylinder or disk. Three symmetrically spaced latching blocks 22 extend from an outside circumferential wall of the locking element 2. A through hole 24 is defined in a center of the locking element 2. Three symmetrically spaced grooves 26 are defined in an inside wall of the locking element 2. The through hole 24 communicates with the grooves 26. Three symmetrically spaced restraining blocks 28 axially extend from one end of the locking element 2. The other end of the locking element 2 opposite to the restraining blocks 28 abuts the open end 14 of the button 1, so that the latching blocks 22 are opposite to the locating blocks 12. In a preferred embodiment, said opposite end of the locking element 2 is adhered to the open end 14 of the button 1, so that the latching blocks 22 are fixed opposite to locating blocks 12.

The driving spring 3 is substantially cylindrical. One end of the driving spring 3 surrounds outside walls of the three restraining blocks 28 and resists said one end of the locking element 2. When the hinge assembly 10 is assembled, the driving spring 3 exerts a slight predetermined pressure on the locking element 2.

The sleeve 32 is substantially a hollow cylinder, and is used for accommodating wires which pass between the cover section 012 and the body section 014. An outside wall of the sleeve 32 includes an enlarged diameter portion and a reduced diameter portion, thereby defining a step 34 where the two portions adjoin each other.

The main shaft 4 includes a shaft portion 42 and a cylinder portion 46. The cylinder portion 46 is disposed at an intermediate part of the shaft portion 42. An outer diameter of the cylinder portion 46 is larger than an outer diameter of the shaft portion 42. The shaft portion 42 includes a first end 40 and a second end 41. Three symmetrically spaced latching protrusions 44 extend from an outer peripheral wall of the first end 40. One end surface of the cylinder portion 46 facing toward the first end 40 of the shaft portion 42 is flat. An opposite end surface of the cylinder portion 46 defines a cam surface 462. The cam surface 462 has three peaks and three valleys at equal angular intervals. The latching protrusions 44 are fitted into the grooves 26 of the locking element 2. The flat end of the cylinder portion 46 abuts against the driving spring 3.

The cam 5 is defined as a part of the barrel 6, and is substantially cylindrical. The cam 5 includes a first end 50 and a second end 51. An axis hole 52 is defined through a center of the cam 5. The axis hole 52 includes an enlarged hole and a reduced hole. The reduced hole is defined in the first end 50. The enlarged hole is defined in the second end 51. An inside wall of the cam 5 where the enlarged hole adjoins the reduced hole defines a step. A latching cam surface 54 is formed on the first end 50 of the cam 5. Three peaks and three valleys are formed on the latching cam surface 54 at equal angular intervals, corresponding to the cam surface 462 to have a first cam engagement. Grooves are defined in the second end 51 of the cam 5. The grooves of the present embodiment are two reverse rotating grooves 56, and two positioning grooves 58 adjacent to the reverse rotating grooves 56 respectively. The reverse rotating grooves 56 are symmetrically opposite each other across the axis hole 52. The positioning grooves 58 are also symmetrically opposite each other across the axis hole 52.

The compression spring 59 is substantially cylindrical. One end of the compression spring 59 is accommodated in the enlarged hole of the cam 5 and resists the cam 5. When the hinge assembly 10 is assembled, the compression spring 59 exerts a predetermined pressure on the cam 5.

Figure 3:
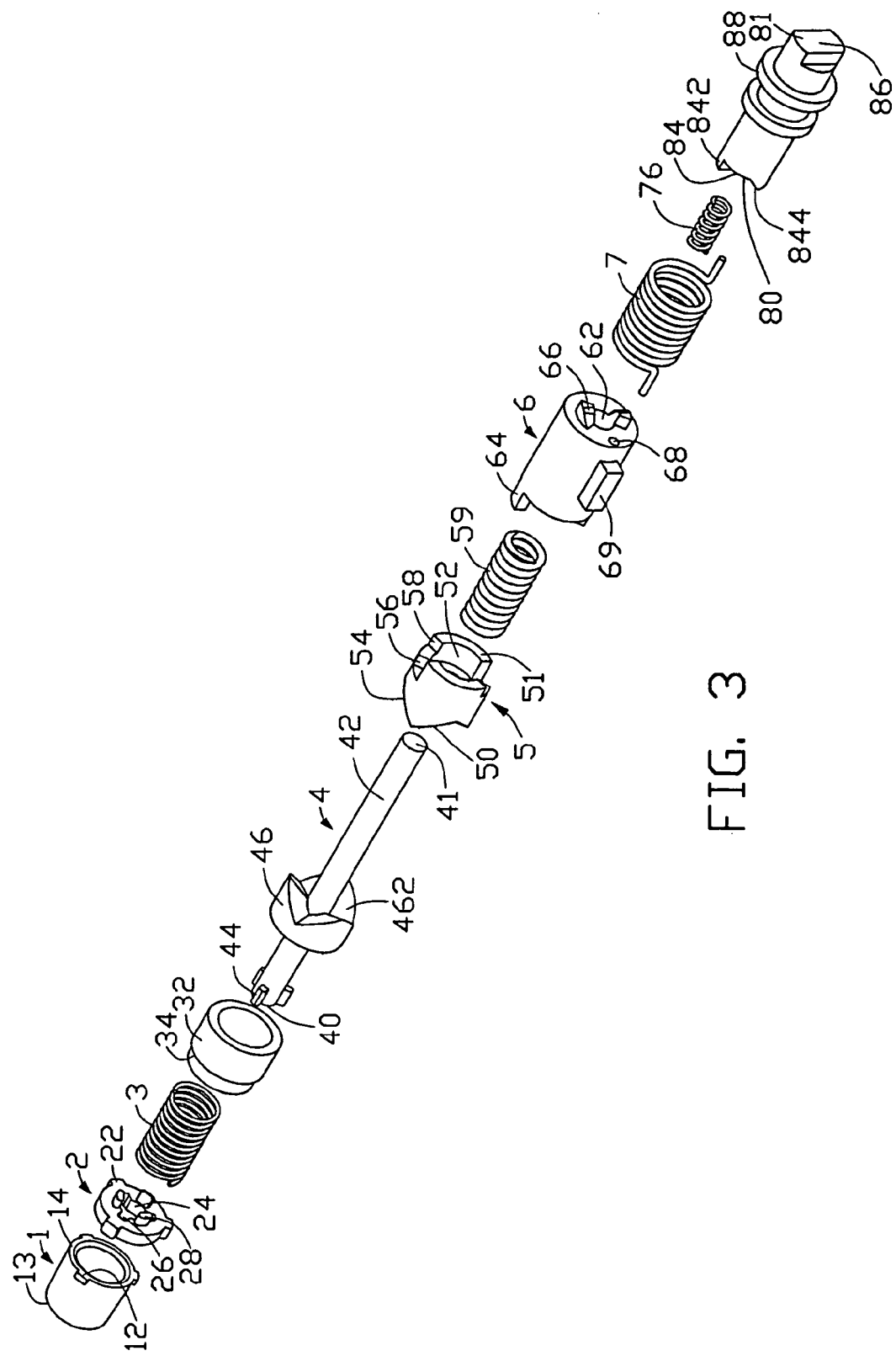
FIG. 3 is similar to FIG. 2, but viewed from another aspect.

The barrel 6 is substantially a hollow cylinder. A stepped hole 62 is defined through a center of the barrel 6. The stepped hole 62 includes an enlarged diameter portion and a reduced diameter portion. Two symmetrically opposite latching posts 64 axially extend from an end of the barrel 6 that corresponds to the enlarged diameter portion of the stepped hole 62. Two symmetrically opposite projections 66 axially extend from an opposite end of the barrel 6 that corresponds to the reduced diameter portion of the stepped hole 62. A distal end surface of each projection 66 is flat. Referring also to FIG. 3, a limitative hole 68 is defined in said opposite end of the barrel 6, between the two projections 66. The compression spring 59 is secured in the enlarged diameter portion of the stepped hole 62. The latching posts 64 are engaged in the reverse rotating grooves 56 or the positioning grooves 58. A protrusion block 69 radially extends from a circumferential wall of the barrel 6, so as to engage with the cover section 012 of the mobile phone 01.

Figure 5:
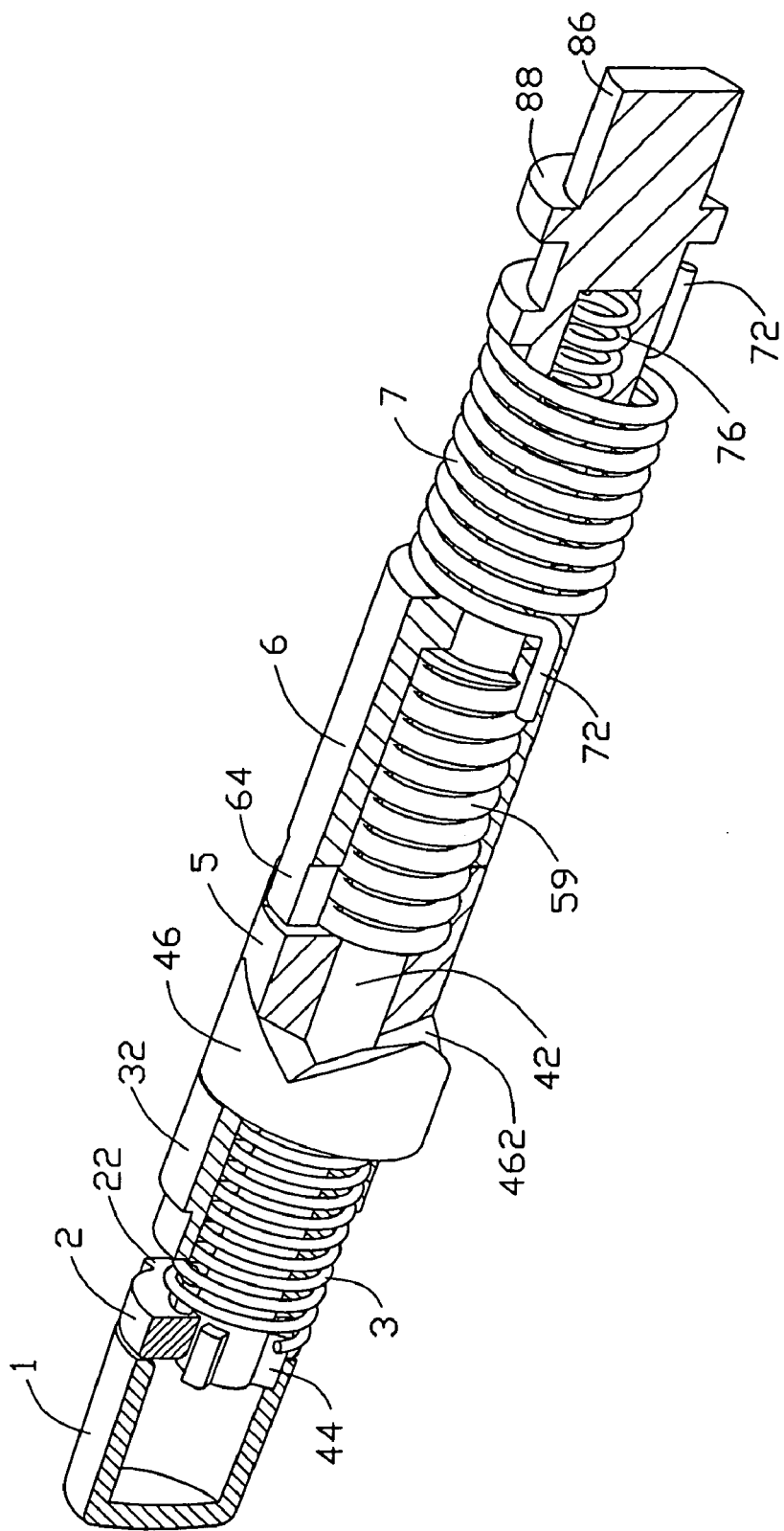
FIG. 5 is a cut-away view of FIG. 4.

The torsion spring 7 is substantially cylindrical. Referring also to FIG. 5, two end portions 72 are axially bent from two opposite ends of the torsion spring 7 respectively. One end portion 72 is inserted into the limitative hole 68 of the barrel 6. When the hinge assembly 10 is assembled, the torsion spring 7 exerts a predetermined pressure and has a predetermined torsion.

The central spring 76 is substantially cylindrical. A diameter of the central spring 76 is small, so that the central spring 76 can be secured in the reduced diameter portion of the stepped hole 62.

Figure 7:
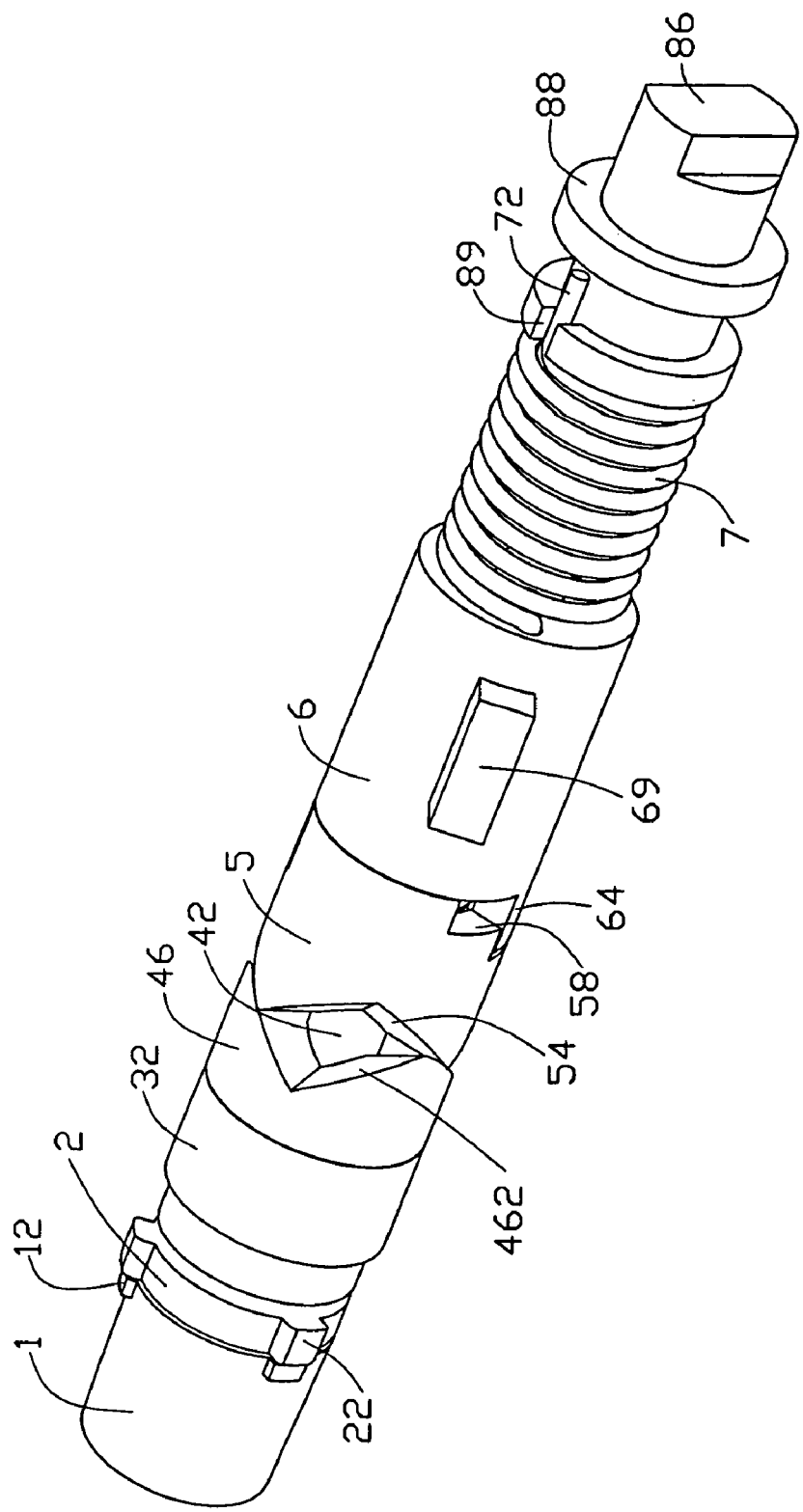
FIG. 7 is similar to FIGS. 4 and 6, but showing the hinge assembly during a process of being moved from the position corresponding to the open state toward the position corresponding to the closed state of the mobile phone.
Figure 8:
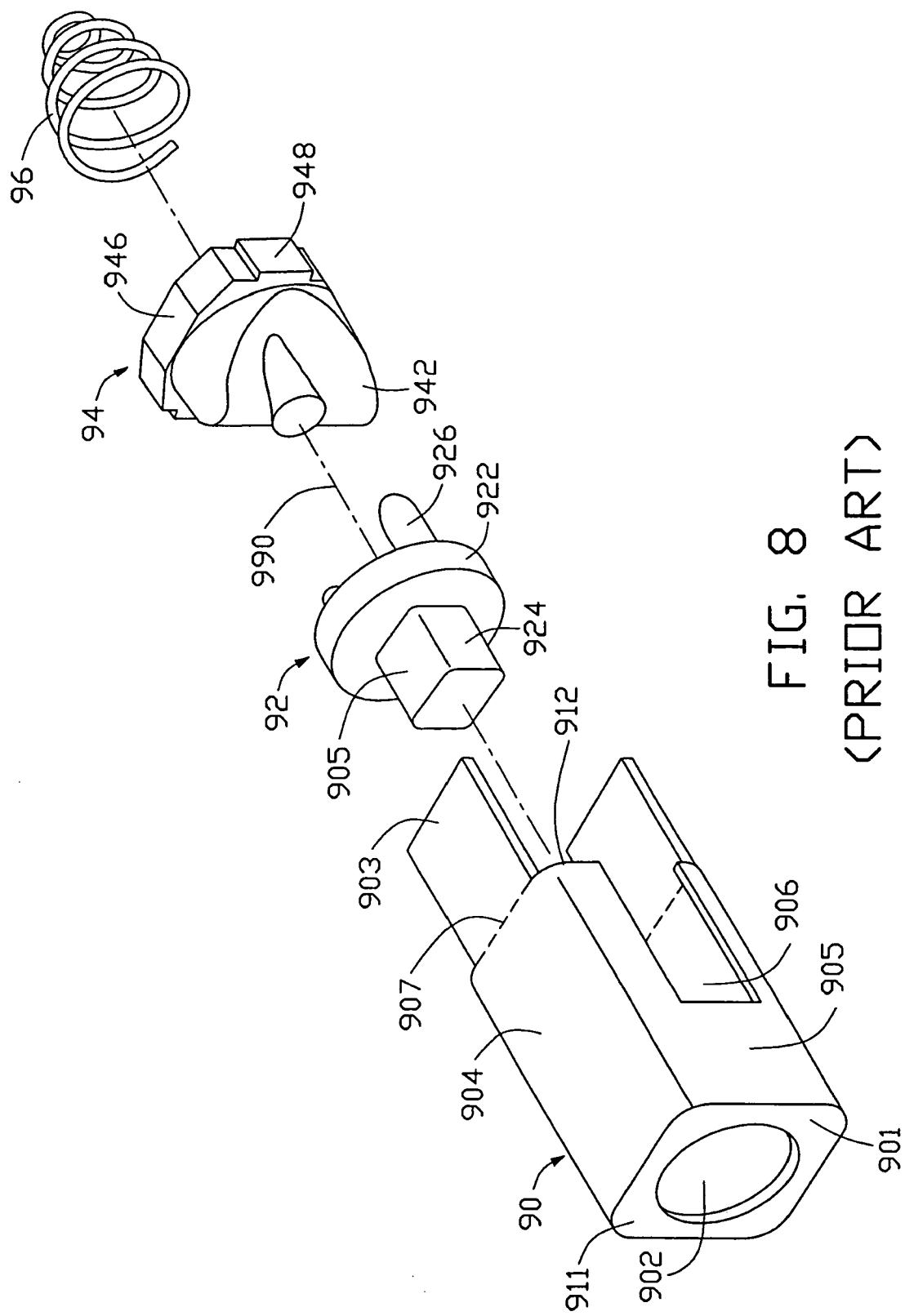
FIG. 8 is an exploded, isometric view of a conventional hinge assembly.

The end shaft 8 is a substantially cylindrical. The end shaft 8 includes a first end 80 and a second end 81. The first end 80 of the end shaft 8 defines a blind receiving hole 82. Two symmetrically opposite latching projections 842 and two symmetrically opposite latching recesses 84 are alternately defined on the first end 80. A distal end surface of each latching projection 842 is flat, with said distal end surfaces corresponding to the distal end surfaces of the projections 66 of the barrel 6 to have a second cam engagement. A slant surface 844 is defined at each of opposite sides of each latching recess 84, and the slant surfaces 844 connecting with corresponding latching projections 842. A fixing portion 86 is provided on the second end 81. The fixing portion 86 has both flat and curved engaging surfaces. Two parallel fixing rings 88 are formed around the end shaft 8 adjacent to the fixing portion 86. The fixing portion 86 and the fixing rings 88 are attached to the body section 014, thereby fixing the end shaft 8 relative to the body section 014. Referring also to FIG. 7, the fixing ring 88 distal from the fixing portion 86 axially defines a locking groove 89 therethrough, for fixing the other end portion 72 of the torsion spring 7 therein.

Figure 4:
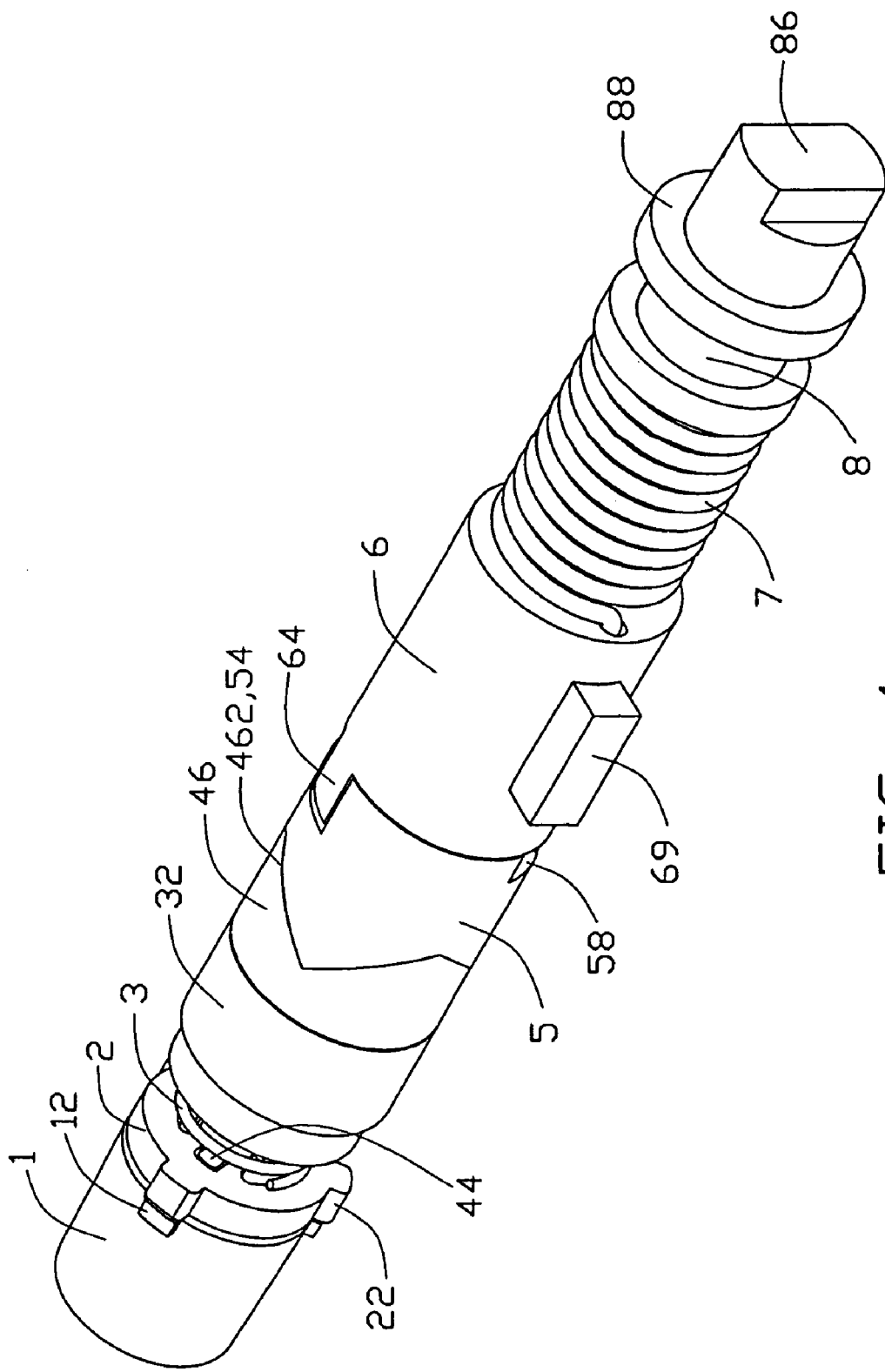
FIG. 4 is an enlarged, assembled view of the hinge assembly shown in FIG. 3, showing the hinge assembly in a position corresponding to a closed state of the mobile phone.

In assembly, referring to FIG. 4 and FIG. 5, the first end 40 of the main shaft 4 is inserted through the sleeve 32, the driving spring 3 and the locking element 2, with the driving spring 3 being received in the sleeve 32 and surrounding the restraining blocks 28. The open end 14 of the button 1 is pushed into abutment with said opposite end of the locking element 2. In a preferred embodiment, said opposite end of the locking element 2 is adhered to the open end 14 of the button 1, so that the latching blocks 22 are fixed opposite to locating blocks 12. Then, the second end 41 of the main shaft 4 is inserted through the cam 5, the compression spring 59 and the barrel 6. Next, one end of the central spring 76 is received in the torsion spring 7 and inserted into the reduced diameter portion of the stepped hole 62. An opposite end of the central spring 76 is received in the receiving hole 82 of the end shaft 8. At the same time, one end portion 72 of the torsion spring 7 is inserted into the limitative hole 68 of the barrel 6, and the other end portion 72 of the torsion spring 7 is locked into the locking groove 89 of the end shaft 8.

The duly assembled hinge assembly 10 is then received in the connecting cylinder of the cover section 012, with the protrusion block 69 being fitted into a groove of the connecting cylinder of the cover section 012. Accordingly, the barrel 6 can rotate together with the cover section 012. Then, the hinge assembly 10 is compressed, the end of the hinge assembly 10 having the button 1 is aligned with the cavity 013 of the body section 014, and the other end of the hinge assembly 10 is aligned with the latching cavity of the body section 014. Next, the hinge assembly 10 is released so as to make the fixing portion 86 and the fixing rings 88 engage in the latching cavity of the body section 014, so that the end shaft 8 is fixed to the body section 014. The cavity 013 of the body section 014 has three sliding grooves (not shown), and the button 1 and the locking element 2 are inserted into the cavity 013. The locating blocks 12 and latching blocks 22 are located in the sliding grooves of the cavity 013, and can slide relative to the body section 014 but cannot rotate relative to the body section 014. The button 1 is exposed at an outside of the body section 014.

Referring to FIG. 4, this corresponds to a position in which the cover section 012 is closed relative to the body section 014. The latching protrusions 44 at the first end of the main shaft 4 are fitted into the grooves 26 of the locking element 2, and the cam surface 462 of the main shaft 4 is fittingly engaged with the latching cam surface 54 of the cam 5. The latching posts 64 of the barrel 6 are locked in the reverse rotating grooves 56 of the cam 5, and the projections 66 of the barrel 6 resist against the latching projections 842 of the end shaft 8. In this position, the hinge assembly 10 is in a steady state.

Figure 6:
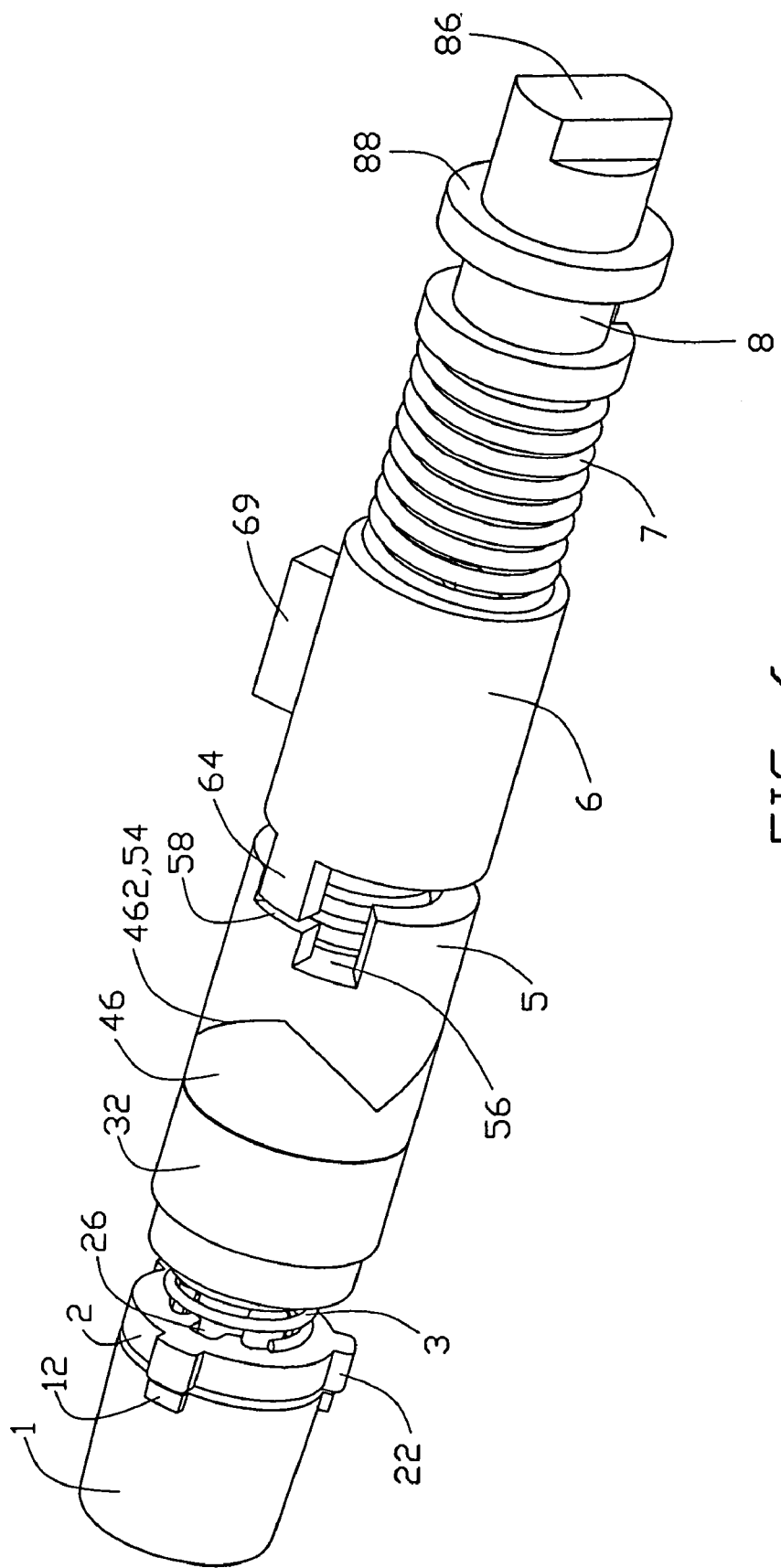
FIG. 6 is similar to FIG. 4, but showing the hinge assembly in a position corresponding to an open state of the mobile phone.

In use, referring to FIG. 6, when a user wants to open the cover section 012 of the mobile phone 01, he/she holds the body section 014 of the mobile phone 01 and presses the button 1. This makes the button 1 and the locking element 2 slide together along their common axis relative to the body section 014. Accordingly, the driving spring 3 and the torsion spring 7 are also pushed and simultaneously acquire elastic force. Owing to the central spring 76 driving the second end 41 of the main shaft 4, the main shaft 4 does not move with the button 1 and the locking element 2, and the latching protrusions 44 of the main shaft 4 exit the grooves 26 of the locking element 2. Because the torsion spring 7 has some predetermined torsion, and one end portion 72 of the torsion spring 7 is locked in the locking groove 89 of the end shaft 8, the other end portion 72 of the torsion spring 7 drives the barrel 6 to rotate in an opening direction, which makes the cam 5 and the main shaft 4 rotate correspondingly in unison with the barrel 6. The main shaft 4 rotates slightly, and the latching protrusions 44 resist against said one end of the locking element 2. Then, the user releases the button 1. The torsion spring 7 drives the barrel 6, the compression spring 59, the cam 5, the shaft 4, the sleeve 32, the driving spring 3, the locking element 2 and the button 1 to move axially until the latching blocks 22 and the locating blocks 12 are latched in the sliding grooves of the body section 014. During the rotating process of the barrel 6, the projections 66 of the barrel 6 move from the latching projections 842 into the latching recesses 84 along the corresponding slant surfaces 844 of the end shaft 8. Owing to the barrel 6 rotating relative to the body section 014, the cover section 012 is also brought to rotate up relative to the body section 014.

When the main shaft 4 has rotated 120 degrees relative to its original position, the latching protrusions 44 again engage in the grooves 26 of the locking element 2. The main shaft 4 stops rotating, and the cam 5 also stops rotating accordingly. The projections 66 of the barrel 6 are locked in the latching recesses 84, therefore the distance between the barrel 6 and the end shaft 8 is reduced. At this time, the cover section 012 is open 120 degrees relative to the body section 014.

Because the distance between the barrel 6 and the end shaft 8 is reduced, and the compression spring 59 has a predetermined pressure, the cam 5 and the barrel 6 are separated a distance. The latching posts 64 exit the reverse rotating grooves 56, and the barrel 6 continues to rotate about another 30 degrees under the force of the torsion spring 7. Referring to FIG. 6, finally, the latching posts 64 are located in the positioning grooves 58. The barrel 6 stops rotating, and the cover section 013 also stops rotating accordingly. At this position, the cover section 013 is in a stable state. The cover section 013 is thus opened to about 150 degrees relative to the body section 014, and is held in that position.

Referring to FIG. 7, when the mobile phone 01 is closed, the user rotates the cover section 013 in a closing direction relative to the body section 014. The cover section 012 drives the barrel 6 to rotate such that it overcomes the torsion of the torsion spring 7. The latching posts 64 of the barrel 6 exit the positioning grooves 58 and move into the reverse rotating groove 56 of the cam 5. Simultaneously, the projections 66 of the barrel 6 move out from the latching recess 84 to the latching projections 842 of the end shaft 8. The latching posts 64 drive the cam 5 to rotate together with the barrel 6, due to the engagement of the latching posts 64 in the reverse rotating grooves 56. Owing to the latching protrusions 44 being locked into the grooves 26 of the locking element 2, the main shaft 4 cannot rotate. Consequently, the latching cam surface 54 of the cam 5 is separated from the cam surface 462 of the main shaft 4 and rotates relative thereto, with the cam 5 driving the main shaft 4, the sleeve 32, the locking element 2 and the button 1 to axially move toward the closed end 13 of the button 1, while the cam 5 and the barrel 6 move toward the end shaft 8. Accordingly, the driving spring 3 and the torsion spring 7 are compressed and respectively acquire some elastic force. Once the peaks of the latching cam surface 54 have ridden over the peaks of the cam surface 462, the user releases the cover section 012. Owing to the driving spring 3 and the torsion spring 7 decompressing, the peaks of the latching cam surface 54 automatically move into the adjoining valleys of the cam surface 462. In reaching this position, the cam 5 has rotated 120 degrees and the barrel 6 has rotated about 150 degrees. That is, the cover section 013 has rotated about 150 degrees back to the closed position.

As described above, the present invention provides an automatic opening and closing hinge assembly for devices such as mobile phones. When the button is pushed, the hinge assembly fully opens the cover section from body section. This provides the user with convenient one-handed operation of the device.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An automatic opening and closing hinge assembly for joining a flip cover section to a body section of a foldable electronic device, comprising:
    a button having an open end;
    a locking element comprising at least one latching block at an outer wall thereof, and defining at least one polygonal hole therein;
    a main shaft including a shaft portion and a cylinder portion, the cylinder portion located at an intermediate portion of the shaft portion, the shaft portion comprising at least one latching protrusion at an end thereof, the cylinder portion comprising a cam surface distal from the latching protrusion, the cam surface comprising three peaks and three valleys at equal angular intervals, the latching protrusion engaging in the polygonal hole of the locking element and releasably locking the main shaft;
    a driving spring around the main shaft, one end of the driving spring resisting the locking element, another end of the driving spring resisting the cylinder portion;
    a cam, one end of the cam comprising a latching cam surface, another end of the cam defining at least one reverse rotating groove, the latching cam surface comprising three peaks and three valleys at equal angular intervals corresponding to the cam surface of the main shaft, the latching cam surface engaging with the cam surface of the main shaft, the cam further defining at least one positioning groove and a stepped axis hole, each positioning groove being adjacent to each of the at least one reverse rotating groove;
    a barrel, one end of the barrel comprising at least one latching post engaging in the at least one reverse rotating groove and rotating together with the cam, the barrel being configured for being fixed relative to one of the cover section and the body section;
    an end shaft being configured for being fixed relative to the other of the body section and the cover section; and
    a torsion spring comprising two end portions attached to the barrel and the end shaft respectively, the barrel rotating relative to the end shaft under urging by the torsion spring;
    wherein the button, the looking element and the driving spring are located around one end of the main shaft, and the cam and the barrel are located around another end of the main shaft.

2. The hinge assembly as claimed in claim 1, wherein two projections extend from another end of the barrel opposite to the at least one latching post, and said another end of the barrel defines a limitative hole between the projections.

3. The hinge assembly as claimed in claim 2, wherein one end portion of the torsion spring is received in the limitative hole of the barrel.

4. The hinge assembly as claimed in claim 3, further comprising a compression spring, wherein the barrel defines a stepped hole, and the compression spring is received in the stepped hole of the barrel and the axis hole of the cam.

5. The hinge assembly as claimed in claim 4, wherein one end of the end shaft defines a receiving hole, the end shaft defines at least one latching recess and at least one latching projection at said one end thereof, and the projection of the barrel is engaged with each latching projection or in each latching recess.

6. The hinge assembly as claimed in claim 5, further comprising a central spring, wherein the central spring is received in the receiving hole of the end shaft and the stepped hole of the barrel.

7. The hinge assembly as claimed in claim 6, wherein another end of the end shaft comprises a fixing portion, for engagement of the end shaft with the foldable electronic device.

8. The hinge assembly as claimed in claim 7, wherein two fixing rings are provided on an outside wall of the end shaft, and at least one of the fixing rings defines a locking groove.

9. The hinge assembly as claimed in claim 8, wherein one end portion of the torsion spring is received in the locking groove of the end shaft.

10. The hinge assembly as claimed in claim 9, wherein the locking element comprises a plurality of restraining blocks axially extending from one end thereof, and the driving spring is located around the restraining blocks.

11. The hinge assembly as claimed in claim 10, frther comprising a sleeve, the sleeve being located around the driving spring.

12. The hinge assembly as claimed in claim 11, wherein the polygonal hole comprises a central through hole and at least one groove in communication with the through hole.

* * * * *